(12) United States Patent
Yamada

(10) Patent No.: US 10,881,047 B2
(45) Date of Patent: Jan. 5, 2021

(54) ROBOT MOWER WITH PROTRUDING BLADES

(71) Applicant: Kubota Corporation, Osaka (JP)

(72) Inventor: Masahiro Yamada, Sakai (JP)

(73) Assignee: Kubota Corporation, Osaka (JP)

( * ) Notice: Subject to any disclaimer, the term of this patent is extended or adjusted under 35 U.S.C. 154(b) by 126 days.

(21) Appl. No.: 15/996,608

(22) Filed: Jun. 4, 2018

(65) Prior Publication Data

US 2019/0364727 A1 Dec. 5, 2019

(51) Int. Cl.
| | | |
|---|---|---|
| *A01D 34/84* | (2006.01) | |
| *A01D 34/416* | (2006.01) | |
| *A01D 34/66* | (2006.01) | |
| *A01D 34/00* | (2006.01) | |

(52) U.S. Cl.
CPC ........... *A01D 34/84* (2013.01); *A01D 34/416* (2013.01); *A01D 34/66* (2013.01); *A01D 34/008* (2013.01)

(58) Field of Classification Search
CPC ........ A01D 34/63; A01D 34/84; A01D 34/66; A01D 34/661; A01D 34/863; A01D 69/005; A01D 34/008; A01D 34/416
See application file for complete search history.

(56) References Cited

U.S. PATENT DOCUMENTS

| | | | | |
|---|---|---|---|---|
| 2,870,592 A | * | 1/1959 | Swanson | A01D 34/661 56/13.6 |
| 2,898,725 A | * | 8/1959 | Roesel | A01D 34/733 56/294 |
| 3,152,431 A | * | 10/1964 | Beaman, Jr. | A01D 34/66 56/13.6 |
| 3,780,504 A | * | 12/1973 | Haseloff | A01D 34/685 56/13.6 |
| 4,024,695 A | * | 5/1977 | Haseloff | A01D 34/685 56/15.4 |
| 4,378,668 A | * | 4/1983 | Gullett | A01D 34/4168 56/12.7 |
| 7,729,801 B2 | * | 6/2010 | Abramson | A01D 34/008 700/245 |
| 8,234,848 B2 | | 8/2012 | Messina et al. | |
| 8,783,005 B1 | * | 7/2014 | Bernard | A01D 34/416 56/13.7 |
| 9,516,808 B2 | | 12/2016 | Takaoka et al. | |
| 9,807,930 B1 | | 11/2017 | Lydon et al. | |
| 2004/0148917 A1 | * | 8/2004 | Eastwood | A01D 75/306 56/6 |
| 2007/0142964 A1 | * | 6/2007 | Abramson | A01D 34/008 700/245 |

* cited by examiner

*Primary Examiner* — Alicia Torres
(74) *Attorney, Agent, or Firm* — The Webb Law Firm

(57) ABSTRACT

A robot mower includes a left cutter blade unit rotatable about a left vertical shaft to generate a left rotation locus, a right cutter blade unit rotatable about a right vertical shaft to generate a right rotation locus and a center cutter blade unit rotatable about a center vertical shaft to generate a center rotation locus. A portion of the left rotation locus protrudes more on a lateral outer side than the vehicle body and the left rear wheel and a portion of the right rotation locus protrudes more on a lateral outer side than the vehicle body and the right rear wheel. The center cutter blade unit is disposed between the left rear wheel and the right rear wheel in such a manner as to cover an uncut area formed due to presence of a gap between the left cutter blade unit and the right cutter blade unit.

10 Claims, 2 Drawing Sheets

ROBOT MOWER WITH PROTRUDING BLADES

TECHNICAL FIELD

The present invention relates to a robot mower configured to carry out a grass cutting work while traveling.

BACKGROUND ART

In a general-purpose riding mower such as one disclosed in U.S. Pat. No. 9,516,808, a mower unit is suspended from a vehicle body frame via a link mechanism between front wheels and rear wheels. In order to secure a large cutting width per unit traveling, the mower unit is provided with three rotary blades (a left blade, a center blade, and a right blade) that are disposed side by side in a vehicle body transverse direction. The left blade and the right blade are disposed at a substantially same position in regards the vehicle body transverse direction and the center blade is disposed slightly forwardly of the left blade and the right blade in a vehicle body front-rear direction. These three rotary blades have rotation loci thereof disposed close to each other. In this, a grass cutting trace of the left blade and a grass cutting trace of the right blade which traces are left by traveling are slightly overlapped with each other. Similarly, a grass cutting trace of the center blade and that of the right blade are slightly overlapped. With this arrangement, there is formed no uncut area among the three rotary blades.

However, in the case of a robot mower which is required to be much smaller and lighter than a riding type mower, it is not desirable to dispose a large mower unit between a front wheel(s) and rear wheels. In a robot mower disclosed in U.S. Pat. No. 8,234,848, a rotational shaft is provided at an approximate center between the front wheels and the rear wheels and a cutter blade rotatable about this rotational shaft has a length designed not to interfere with the front wheel or the rear wheels. In this case, the grass cutting area per unit traveling is small and a work efficiency is poor. Moreover, since the rotation locus of the cutter blade is confined to the inner side of the vehicle body, uncut area will be formed in the case of an edge cutting work which is effected with placing the vehicle body near a wall or a tree.

In an attempt to improve the grass cutting area per unit traveling, a robot mower disclosed in U.S. Pat. No. 9,807,930 is provided with two rotary cutter blades disposed side by side in the vehicle body transverse direction. In a grass cutting work by such two rotary blades juxtaposed on the left and right sides, an uncut area will be formed inevitably due to the presence of a gap formed between the respective cutter blade rotation loci. Moreover, with this robot mower too, since the rotation loci of the two cutter blades are confined to the inner side of the vehicle body, an edge cutting work is difficult.

SUMMARY OF THE INVENTION

An object of the present invention is to provide a robot mower that can improve a grass cutting area per unit traveling and that also allows an effective edge cutting work.

According to the present invention, a robot mower configured to carry out a grass cutting work while traveling comprises:
a vehicle body;
a front wheel unit;
a rear wheel unit having a left rear wheel and a right rear wheel; and
a mower unit supported to the vehicle body;
wherein the mower unit includes:
a left cutter blade unit rotatably about a left vertical shaft to generate a left rotation locus;
a right cutter blade unit rotatably about a right vertical shaft to generate a right rotation locus; and
a center cutter blade unit rotatably about a center vertical shaft to generate a center rotation locus;
wherein the left cutter blade unit and the right cutter blade unit are disposed forwardly of the rear wheel unit and spaced apart from each other in a vehicle body transverse direction;
a portion of the left rotation locus protrudes more on a lateral outer side than the vehicle body and the left rear wheel;
a portion of the right rotation locus protrudes more on a lateral outer side than the vehicle body and the right rear wheel; and
wherein the center cutter blade unit is disposed between the left rear wheel and the right rear wheel in such a manner as to cover an uncut area formed due to presence of a gap between the left cutter blade unit and the right cutter blade unit.

With the robot mower described above, the left cutter blade unit and the right cutter blade unit are disposed side by side with a gap therebetween, and an uncut area formed due to this gap is cut by the center cutter blade unit. A cutting width at the time of traveling is equal to a sum of a cutting width of the left cutter blade unit, a cutting width of the right cutter blade unit and the gap. With this arrangement, the grass cutting area per unit traveling has been improved. Further, since the left cutter blade unit and the right cutter blade unit are disposed forwardly of the pair of left and right rear wheel and the center cutter blade unit is disposed between the left rear wheel and the right rear wheel, these three rotary blades utilize the space available under the vehicle body without loss. Moreover, the rotation locus generated by the left cutter blade unit protrudes outwards beyond the vehicle body and the left rear wheel and the rotation locus generated by the right cutter blade unit protrudes outwards beyond the vehicle body and the right rear wheel. This arrangement allows the vehicle body to be located near a wall or a tree to carry out an edge cutting work effectively.

The greater the left rotation locus and the right rotation locus protrude more outwards than the vehicle body, the easier the edge cutting work. For this reason, it is advantageous to reduce the width of a vehicle body front portion including the front wheel. This can be realized as the front wheel is constituted of a single wheel disposed at the center in the vehicle body transverse direction. Preferably, in order to lessen a shock that will occur when a leading end of a cutter blade unit protruding outwards from the vehicle body comes into contact with a wall or a tree, the cutter blade units comprise string trimmers formed of soft material such as nylon.

DETAILED DESCRIPTION

Next, an embodiment of a robot mower according to the present invention will be explained with reference to the accompanying drawings.

Incidentally, in this detailed description, unless indicated explicitly otherwise, a word "front" means the front (forward) side in a vehicle front-rear direction (traveling direction) and a word "rear" means the rear side with respect to the vehicle front-rear direction (traveling direction). Further, a left-right direction or a transverse direction means a vehicle body transverse direction (vehicle body width direction) perpendicular to the vehicle body front-rear direction. A word "upper" or "lower" designates positional relationship with respect to the perpendicular direction of the vehicle body (vertical direction), indicative of a relationship regarding a ground-clearance height.

A robot mower in this embodiment is an autonomous traveling vehicle configured to effect an autonomous traveling with using a vehicle position acquired with use of GNSS and a borderline between a cut area and an uncut area obtained by image processing. Needless to say, the inventive robot mower can also be configured as a radio-controlled vehicle remotely controlled by radio control technique.

Figure 1:
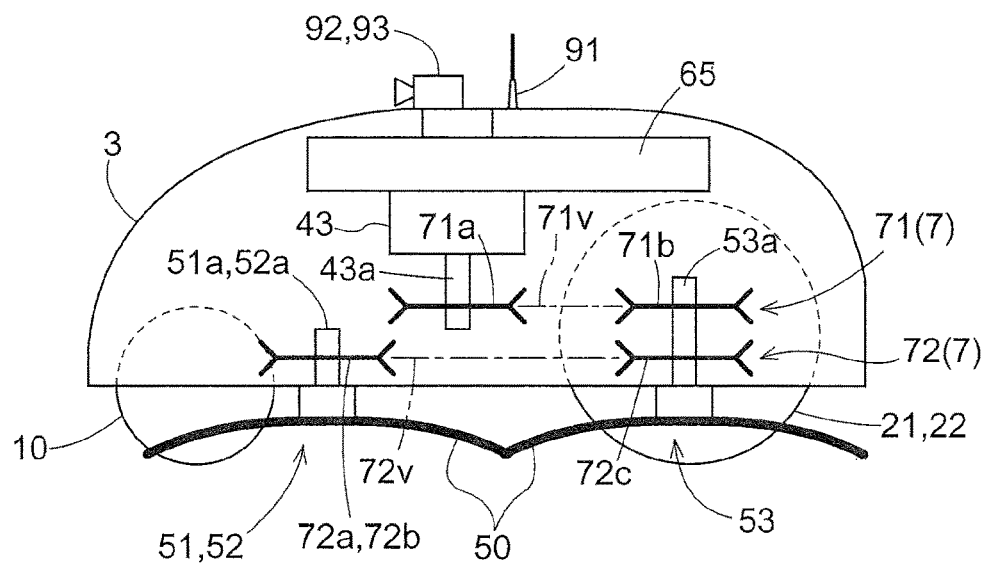
FIG. 1 is a side view of a robot mower.
Figure 2:
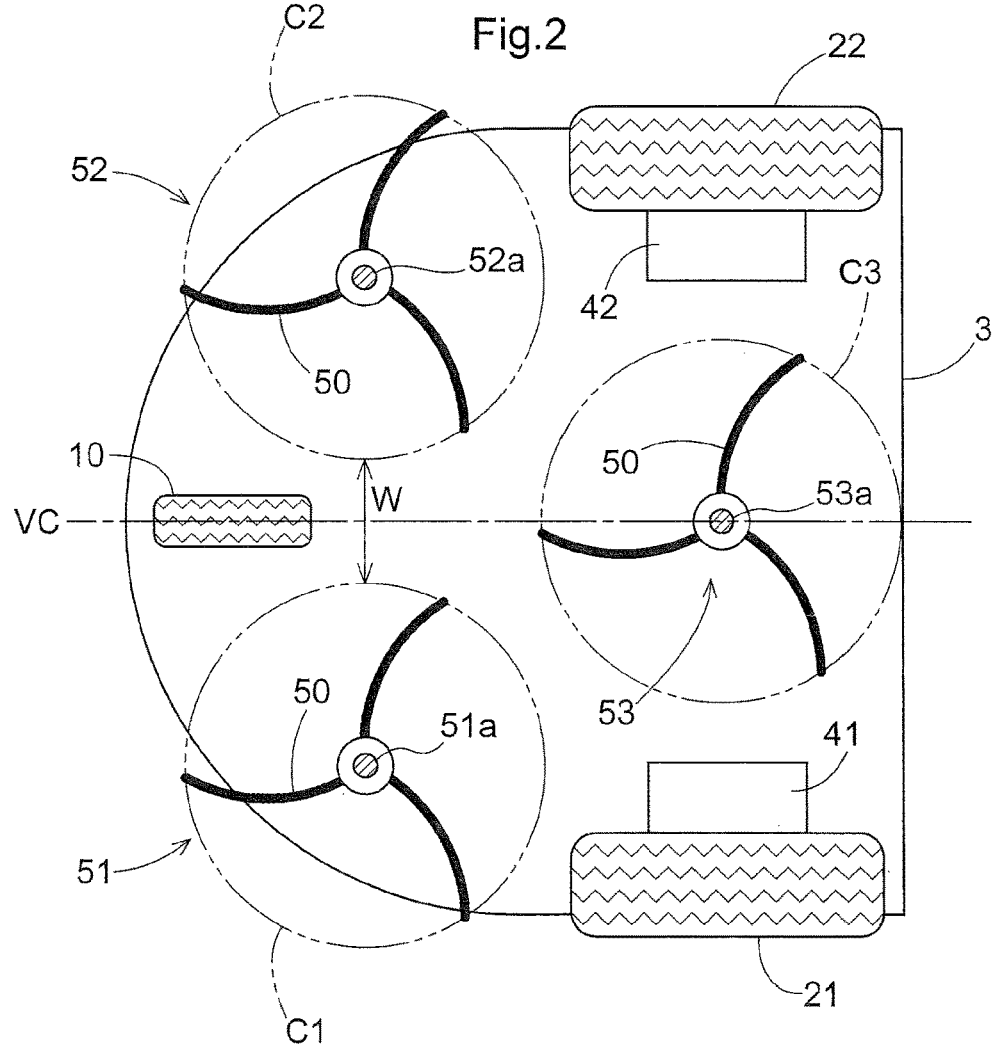
FIG. 2 is a plan view of the robot mower.
Figure 3:
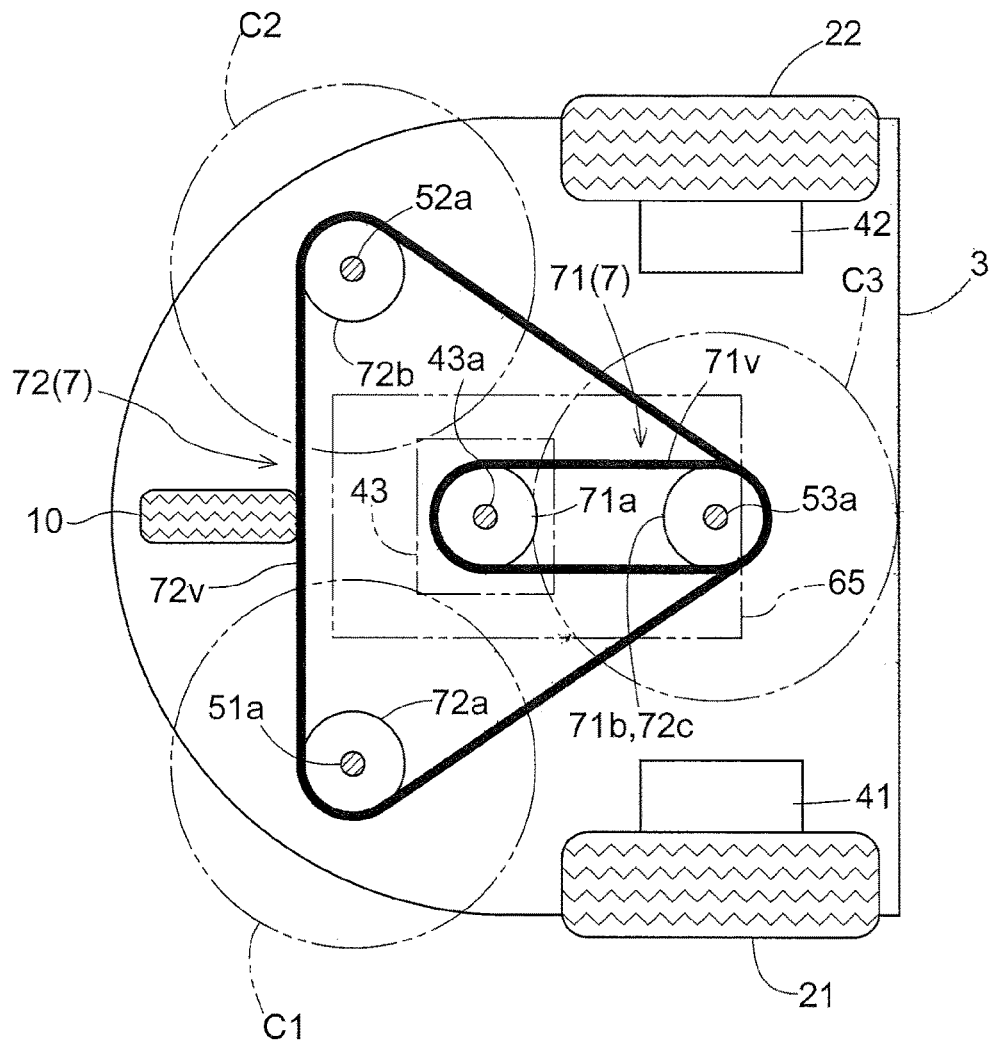
FIG. 3 is a power system diagram of the robot mower.

FIG. 1 is a side view of the robot mower. FIG. 2 is a plan view of the robot mower. Both of these are schematics showing only constituent elements relating to the invention schematically. As shown in FIG. 1, FIG. 2 and FIG. 3, this robot mower comprises a tricycle vehicle including a vehicle body 3 supported by a single front wheel 10 as a "front wheel unit", and a left rear wheel 21 and a right rear wheel 22 which together constitute a "rear wheel unit". The vehicle body 3 is disclosed as a bowl-shaped monocoque structure. Needless to say, the vehicle body 3 can alternatively be comprised of a vehicle body frame and a cover to be attached to the vehicle body frame.

The left rear wheel 21 and the right rear wheel 22 are disposed with a space therebetween in a vehicle body transverse direction and driven independently of each other. The front wheel 10 is a caster wheel. When the left rear wheel 21 and the right rear wheel 22 are rotated at an equal speed and in a same direction, straight traveling is effected. When the left rear wheel 21 and the right rear wheel 22 are rotated at different speeds and in a same direction, a turning to the side of the lower speed is effected. When the left rear wheel 21 and the right rear wheel 22 are rotated in opposite directions from each other, a spin turn is effected.

The vehicle body 3 mounts three rotary cutter units as the mower unit, namely, a left cutter blade unit 51, a right cutter blade unit 52 and a center cutter blade unit 53. These rotary cutter units are string trimmers using soft strings 50 acting as rotary blades rotatable about vertical axes. The strings 50 of the left cuter blade unit 51 are fixed to a lower portion of a left vertical shaft 51a and rotated about this left vertical shaft 51a to generate a left rotation locus C1. The strings 50 of the right cuter blade unit 52 are fixed to a lower portion of a right vertical shaft 52a and rotated about this right vertical shaft 52a to generate a right rotation locus C2. The strings 50 of the center cuter blade unit 53 are fixed to a lower portion of a center vertical shaft 53a and rotated about this center vertical shaft 53a to generate a center rotation locus C3.

The left cutter blade unit 51 and the right cutter blade unit 52 are disposed forwardly of the left rear wheel 21 and the right rear wheel 22 and spaced apart from each other in the vehicle body transverse direction. The center cutter blade unit 53 is disposed between the left rear wheel 21 and the right rear wheel 22.

As may be apparent from FIG. 2, the left vertical shaft 51a of the left cutter blade unit 51 is disposed such that a portion of the left rotation locus C1 protrudes more on a lateral outer side than the vehicle body 3 and the left rear wheel 21 in the vehicle body transverse direction; and the right vertical shaft 52a of the right cutter blade unit 52 is disposed such that a portion of the right rotation locus C2 protrudes more on a lateral outer side than the vehicle body 3 and the right rear wheel 22 in the vehicle body transverse direction. In this embodiment, the vehicle body 3 is formed like a dome whose width progressively reduces toward the front side, so the areas of outward protrusions from the vehicle body 3 of the left rotation locus C1 and the right rotation locus C2 are large, thus achieving improvement of edge cutting performance.

In the vehicle body transverse direction, a gap (denoted by "W" in FIG. 2) is present between the left rotation locus C1 and the right rotation locus C2. Due to the presence of this gap, there is formed an uncut area having the width W when the robot mower has traveled forwardly with driving its mower unit. The center vertical shaft 53a of the center cutter blade unit 53 is disposed such that the center rotation locus C3 may pass over this uncut area. Thus, the uncut area is covered by the center rotation locus C3. The center vertical shaft 53a of the center cutter blade unit 53 is positioned on a vehicle body centerline (denoted with "VC" in FIG. 2) extending in the vehicle body front-rear direction and between the left rear wheel 21 and the right rear wheel 22. As may be apparent from FIG. 2, as seen in a plan view, lines interconnecting the three vertical shafts 51a, 52a, 53a of the cuter blade unit form a substantially equilateral inverted triangle and overlapped with a triangle formed of lines interconnecting the centers of the front wheel 10, the left rear wheel 21 and the right rear wheel 22.

Figure 4:
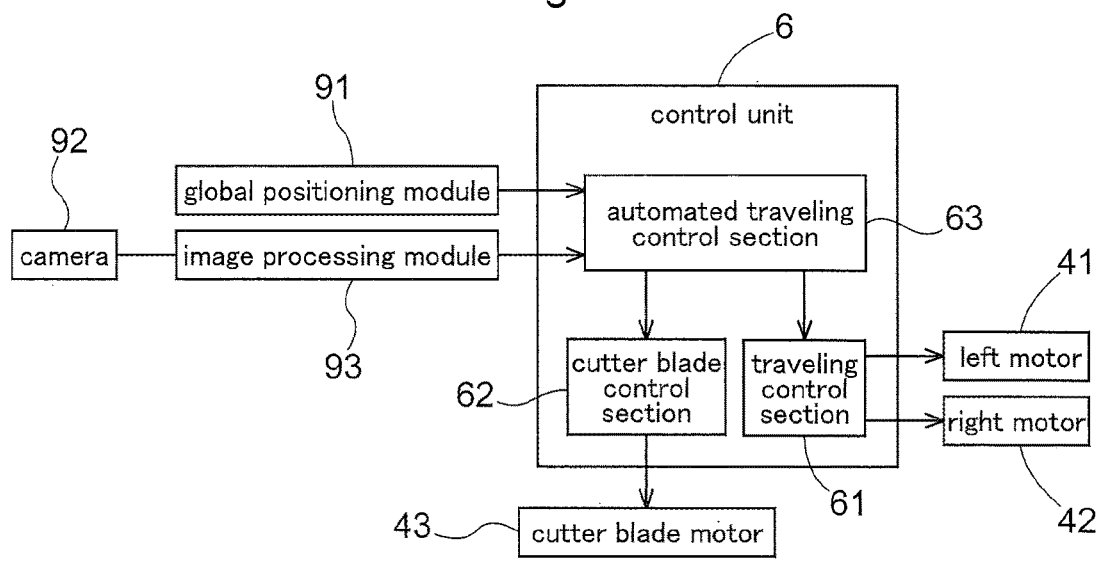
FIG. 4 is a functional block diagram of a control unit.

FIG. 4 shows a control unit 6 of this robot mower. The control unit 6 includes a traveling control section 61, a cutter blade control section 62 and an automated (autonomous) traveling control section 63. The traveling control section 61 controls driving of a left motor 41 and a right motor 42. The cutter blade control section 63 controls driving of a cutter blade motor 43. The automated traveling control section 6 manages the traveling control section 61 and the cutter blade control section 62 so that the vehicle may travel automatically (autonomously) while cutting grass, based on information from a global positioning module 91 and an image processing module 93 and set automated (autonomous) traveling map information.

As may be apparent from the power system diagram shown in FIG. 3, at rear portions of the vehicle body 3, there are mounted the left motor 41 as the power source of of the left rear wheel 21 and the right motor 42 as the power source of the right rear wheel 22. The left motor 41 and the right motor 42 are controlled independently of each other, by the traveling control section 61 of the control unit 6. A traveling power transmission mechanism for transmitting power from the left motor 41 to the left rear wheel 21 and from the right motor 42 to the right rear wheel 22, though not shown in details herein, can be constituted of a chain transmission mechanism, a belt transmission mechanism, a gear transmission mechanism, etc. Further alternatively, with use of a wheel motor, such traveling power transmission mechanism can be omitted substantially.

The cutter blade motor 43 as the power source for the left cutter blade unit 51, the right cutter blade unit 52 and the center cutter blade unit 53 is disposed at the substantial center of the vehicle body 3. A cutter blade power transmission mechanism is provided for supplying power from the cutter blade motor 43 to the center blade unit 53, the left cutter blade unit 51 and the right cutter blade unit 52. In the instant embodiment, this cutter blade power transmission mechanism is of a belt transmission type. Namely, the cutter blade power transmission mechanism 7 consists of a first belt mechanism 71 and a second belt mechanism 72. The first belt mechanism 71 consists of a first output pulley 71a fixed to a downwardly oriented motor shaft 43a of the cutter blade motor 43, a first input pulley 71b fixed to the center vertical shaft 53a and a first belt 71v entrained around the output and input pulleys. The second belt mechanism 72 consists of a second input pulley 72c fixed to the center vertical shaft 53a, a left pulley 72a fixed to the left vertical shaft 51a, a right pulley 72b fixed to the right vertical shaft 52a and a second belt entrained around these respective pulleys.

The cutter blade motor 43 is controlled by the cutter blade control section 62 of the control unit 6. The right cutter blade unit 52, the center cutter blade unit 53 and a battery 65 as an electric power source of the cutter blade motor 43 are disposed at the center portion of the vehicle body 3 and upwardly of the cutter blade motor 43.

Further, on a ceiling portion of the vehicle body 3, there is mounted the global positioning module 91 constituted of a GNSS module. This global positioning module 91 is provided at the top portion of the vehicle body 3 of a satellite antenna for receiving radio waves from a satellite. Incidentally, in order to supplement a satellite navigation system, the global positioning module 91 can include an inertial navigation module incorporating a gyro acceleration sensor, a magnetic bearing sensor, etc. Needless to say, such inertial navigation module can be provided at a site separate from the global positioning module 91.

Further, at the ceiling portion of the vehicle body 3, there are provided a vehicle-mounted camera 92 and the image processing module 93. The image processing module 93 has a function of detecting a borderline between a cut land and an uncut land or a function of detecting an obstacle, from photographed image. Positioning information acquired by the global positioning module 91 and detection information from the image processing module 93 are utilized for automated (autonomous) traveling by the automated traveling control section 63 provided in the control unit 6.

Next, further embodiments will be described one after another.

(1) In the foregoing embodiment, the cutter blade unit was configured as a string trimmer. Instead, a rotary plate blade type or a reel type can be employed.

(2) In the foregoing embodiment, the robot mower was configured as an electric vehicle using a battery and motors. Instead, it maybe an engine vehicle using an internal combustion engine or a hybrid vehicle having a motor and an internal combustion engine in combination.

(3) In the foregoing embodiment, the left rear wheel 21 and the right rear wheel 22 were provided with dedicated motors (left motor 41 and right motor 42). Alternatively, it is also possible to employ an arrangement replacing the left motor 41 and the right motor 42 by a common rear wheel motor and using a left speed changer and a right speed changer which are operable independently of each other.

(4) In the foregoing embodiment, there was employed a steering arrangement of steering based on a rotation difference between the left rear wheel 21 and the right rear wheel 22. Instead, it is also possible to employ a steering arrangement configuring the front wheel 10 as the steering wheel.

(5) As the automated traveling control in the automated traveling control section 63, it is possible to employ a control of effecting automated traveling along a preset traveling route, a control of effecting automated traveling on an uncut land with determining a traveling direction in real time while avoiding obstacles, a control in which a managing person effects steering with using a remote controller, etc. Further alternatively, in place of obstacle detection by image processing, an obstacle detection sensor using ultrasonic wave or laser may be used.

Incidentally, it is understood that the arrangements disclosed in the foregoing embodiment (also in the further embodiments) can be used in any combination with the arrangements disclosed in the other embodiments unless contraction results from such combinations. Further, it should be understood that the embodiments disclosed in this are only exemplary and the scope of the invention is not limited thereto. Various modifications thereof are possible within a scope not departing from the essence of the present invention.

The invention claimed is:

1. A robot mower configured to carry out a grass cutting work while traveling, the robot mower comprising:
a vehicle body, wherein the vehicle body is a bowl-shaped monocoque structure having a forward region that tapers toward a front end of the vehicle body, with a reduced distance in a vehicle body transverse direction between a left side edge and a right side edge of the forward region;
a front wheel unit;
a rear wheel unit having a left rear wheel and a right rear wheel; and
a mower unit supported by the vehicle body;
wherein the mower unit includes:
a left cutter blade unit rotatable about a left vertical shaft to generate a left rotation locus;
a right cutter blade unit rotatable about a right vertical shaft to generate a right rotation locus; and
a center cutter blade unit rotatable about a center vertical shaft to generate a center rotation locus;
wherein the left cutter blade unit and the right cutter blade unit are disposed forwardly of the rear wheel unit and spaced apart from each other in the vehicle body transverse direction;
a portion of the left rotation locus protrudes obliquely forward from the left side edge of the forward region of the vehicle body;
a portion of the right rotation locus protrudes obliquely forward from the right side edge of the forward region of the vehicle body; and
wherein the center cutter blade unit is disposed between the left rear wheel and the right rear wheel in such a manner as to cover an uncut area formed due to presence of a gap between the left cutter blade unit and the right cutter blade unit.

2. The robot mower of claim 1, wherein the front wheel unit is disposed between the left rotation locus and the right rotation locus.

3. The robot mower of claim 1, wherein the front wheel unit comprises a single wheel disposed at the center in the vehicle body transverse direction.

4. The robot mower of claim 2, wherein:
the front wheel unit, the left rear wheel and the right rear wheel are displayed in a triangular layout as seen in a plan view; and
the left cutter blade unit, the right cutter blade unit and the center cutter blade unit are disposed in an inverted triangular layout as seen in a plan view and overlapped with each other.

5. The robot mower of claim 1, wherein each cutter blade unit comprises a string trimmer.

6. The robot mower of claim 1, further comprising:
a vehicle-mounted camera;

an image processing module that processes a photographed image by the vehicle-mounted camera, the image processing module outputting, from the photographed image, detection information indicative of a borderline between a cut land and an uncut land or indicative of an obstacle;

a satellite positioning module that acquires positioning information; and an automated traveling control section that utilizes the detection information and the positioning information for automated traveling of the mower.

7. A robot mower configured to carry out a grass cutting work while traveling, the robot mower comprising:

a vehicle body having a forward region that tapers toward a front end of the vehicle body, with a reduced distance in a vehicle body transverse direction between a left side edge and a right side edge of the forward region;

a front wheel unit disposed at a central portion in the vehicle body transverse direction;

a rear wheel unit having a left rear wheel disposed at a left end portion in the vehicle body transverse direction, and a right rear wheel disposed at a right end portion in the vehicle body transverse direction; and a mower unit supported by the vehicle body;

wherein the mower unit includes:

a left cutter blade unit rotatable about a left vertical shaft to generate a left rotation locus;

a right cutter blade unit rotatable about a right vertical shaft to generate a right rotation locus; and a center cutter blade unit rotatable about a center vertical shaft to generate a center rotation locus;

wherein the left cutter blade unit and the right cutter blade unit are disposed forwardly of the rear wheel unit and spaced apart from each other in the vehicle body transverse direction;

the left vertical shaft is disposed on a lateral inner side of the left rear wheel;

the right vertical shaft is disposed on a lateral inner side of the right rear wheel;

a portion of the left rotation locus protrudes more on a lateral outer side than the left rear wheel;

a portion of the right rotation locus protrudes more on a lateral outer side than the right rear wheel;

a part of the left rotation locus protrudes obliquely forward from the left side edge of the forward region of the vehicle body;

a part of the right rotation locus protrudes obliquely forward from the right side edge of the forward region of the vehicle body; and wherein a gap between the left rotation locus and the right rotation locus is smaller than a diameter of the center rotation locus; and the center cutter blade unit is disposed between the left rear wheel and the right rear wheel such that an uncut area formed due to presence of a gap between the left cutter blade unit and the right cutter blade unit may be cut by the center cutter blade unit.

8. The robot mower of claim 7, wherein the left vertical shaft, the right vertical shaft and the center vertical shaft are covered by a dome-shaped cover.

9. The robot mower of claim 8, wherein:

the dome-shaped cover forms the vehicle body; and the portion of the left rotation locus protrudes more on the lateral outer side than the dome-shaped cover and the left rear wheel, and the portion of the right rotation locus protrudes more on the lateral outer side than the dome-shaped cover and the right rear wheel.

10. The robot mower of claim 7, further comprising:

a vehicle-mounted camera;

an image processing module that processes a photographed image by the vehicle-mounted camera, the image processing module outputting, from the photographed image, detection information indicative of a borderline between a cut land and an uncut land or indicative of an obstacle;

a satellite positioning module that acquires positioning information; and an automated traveling control section that utilizes the detection information and the positioning information for automated traveling of the mower.

* * * * *